Figure 1:
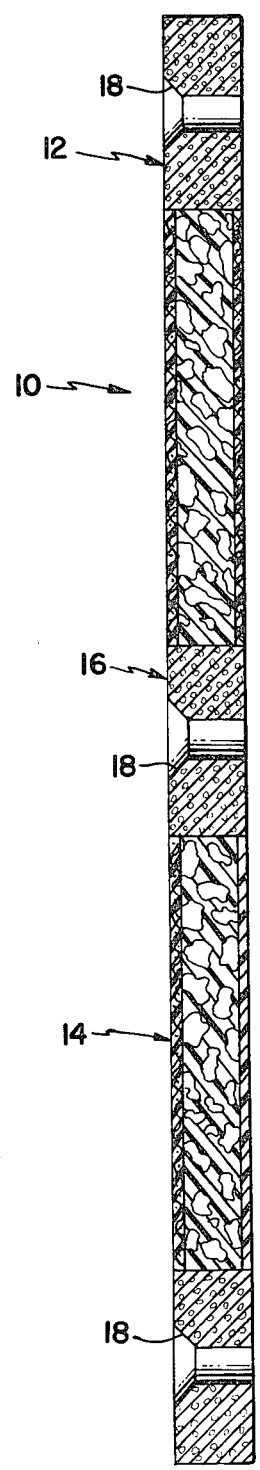

United States Patent [19]

Gagliani et al.

[11] 4,367,296

[45] Jan. 4, 1983

[54] STRUCTURAL MATERIALS AND COMPONENTS

[75] Inventors: John Gagliani, Schaumburg; Raymond Lee, Elk Grove Village, both of Ill.

[73] Assignee: International Harvester Company, Chicago, Ill.

[21] Appl. No.: 324,632

[22] Filed: Nov. 24, 1981

Related U.S. Application Data

[62] Division of Ser. No. 186,563, Sep. 12, 1980.

[51] Int. Cl.³ .......................... C08J 9/02; C08L 79/08
[52] U.S. Cl. ........................ 521/189; 521/54;
521/91; 521/122; 521/184; 521/185; 521/77;
523/219; 524/600; 528/229; 156/275.5;
428/325; 428/313.9
[58] Field of Search ............... 521/54, 91, 184, 122,
521/185, 189; 523/219; 524/600; 528/229

[56] References Cited

U.S. PATENT DOCUMENTS

| | | | |
|---|---|---|---|
| 3,554,939 | 1/1971 | Lavin | 260/37 N |
| 3,661,849 | 5/1972 | Culbertson | 260/37 N |
| 3,700,649 | 10/1972 | Boram et al. | 260/37 N |
| 3,726,834 | 4/1973 | Acle, Jr. | 260/37 N |
| 3,817,927 | 6/1974 | Kovacs et al. | 260/37 N |
| 3,870,677 | 3/1975 | Farrissey, Jr. et al. | 260/37 N |
| 3,939,109 | 2/1976 | Barie, Jr. et al. | 260/37 N |
| 4,043,986 | 8/1977 | Graffaz et al. | 260/37 N |

Primary Examiner—Morton Foelak
Attorney, Agent, or Firm—Le Blanc, Nolan Shur & Nies

[57] ABSTRACT

High density structural ("blocking") materials composed of a polyimide filled with glass microballoons. Structural components such as panels which have integral edgings and/or other parts made of the high density materials.

11 Claims, 3 Drawing Figures

STRUCTURAL MATERIALS AND COMPONENTS

The invention described herein was made in the performance of work under NASA Contract No. NAS9-15484 and is subject to the provisions of Section 305 of the National Aeronautics and Space Act of 1958 (72 Stat. 435; 42 USC 2457).

This application is a division of application Ser. No. 186,563 filed Sept. 12, 1980.

In one aspect our invention relates to structural materials and, more specifically, to novel, improved structural materials composed of a polyimide resin loaded or filled with glass microballoons. We identify such compositions by the term "blocking material."

The invention also relates to novel, improved structural components such as panels composed at least in part of blocking materials having the character described above.

Copending application Ser. No. 186,629 filed Sept. 12, 1980, (now U.S. Pat. No. 4,305,796 issued Dec. 15, 1981) is concerned in part with the fabrication of novel, improved, low density, structural components such as panels from polyimide resins compounded with fillers such as glass fibers and microballoons and typically sandwiched between two sheets of glass fabric.

We have since discovered that, if glass microballoons of a particular size are employed as a filler in such compositions and in appropriate amounts, a high density, even almost solid material can be obtained. Such materials are particularly useful as panel edgings and in other applications where attachment of one component to another is involved because of the high resistance they offer to the direct withdrawal of threaded fasteners such as screws.

Exemplary of the polyimides that can be employed in these novel blocking materials are the copolymers described in U.S. Pat. No. Re. 30,213 and the terpolymers described in application Ser. No. 186,668 filed Sept. 12, 1980. That application was copending with parent application Ser. No. 186,563 but has since been abandoned in favor of application Ser. No. 254,137 filed Apr. 14, 1981, (now U.S. Pat. No. 4,315,076 issued Feb. 9, 1982).

The patented copolymers are derived from precursors which, in their preferred forms, are essentially equimolar mixtures of a lower alkyl half ester of 3,3',4,4'-benzophenonetetracarboxylic acid and two primary diamines. One of the diamines is a heterocyclic diamine, and the other is an aromatic meta- or para-substituted diamine which is free of aliphatic moieties. A ratio of 0.4 to 0.6 mole of heterocyclic diamine per mole of 3,3',4,4'-benzophenonetetracarboxylic acid ester is preferred. However, precursors having a heterocyclic diamine/acid ester ratio of 0.3 have also successfully been employed.

The terpolyimides described in application Ser. No. 186,668 differ chemically from the copolyimides just described in that they are made from precursors which include an aliphatic diamine in addition to the aromatic and heterocyclic diamines employed in the copolyimide precursors.

From 0.05 to 0.3 mole of aliphatic diamine per 1.0 mole of benzophenonetetracarboxylic acid ester can be employed, and from 0.1 to 0.3 mole of heterocyclic diamine per mole of ester can be used.

Exemplary of the aromatic and heterocyclic diamines that can be employed in the just described copolyimides and terpolyimides are:

2,6-diaminopyridine
3,5-diaminopyridine
3,3'-diaminodiphenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene Many other aromatic and heterocyclic diamines have been described in the open and patent literature dealing with the making of polyimides—see, for example, U.S. Pat. No. 3,179,614 issued Apr. 20, 1965, to Edwards; U.S. Pat. No. 3,575,891 issued Apr. 20, 1971, to LeBlanc et al; and U.S. Pat. No. 3,629,180 issued Dec. 21, 1971, to Yoda et al. Aromatic and heterocyclic diamines selected from those listed in the literature can also be utilized in copolyimides and terpolyimides of the character described above.

Aliphatic diamines having from three to 12 carbon atoms have been employed in the terpolyimides. However, diamines having no more than six carbon atoms will typically prove preferable. Also, aliphatic diamines with even numbered chains are preferred.

Aliphatic diamines we have used include:
1,3-diaminopropane
1,4-diaminobutane
1,6-diaminohexane
1,8-diaminooctane
1,12-diaminododecane and Jeffamine 230. The latter is available from the Jefferson Chemical Company and has the formula:

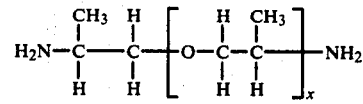

where x is approximately 2.6.

The precursors of the polyimides with which we are concerned are prepared by first reacting 3,3',4,4'-benzophenonetetracarboxylic acid (or, preferably, its dianhydride) with an esterification agent to form an alkyl diester or half ester. Exemplary esterification agents are methyl, ethyl, propyl, and isopropyl alcohols. Methanol is in many cases preferred because of its widespread availability, low cost, and other attributes and because its use facilitates conversion of the precursor to a polyimide.

Ethanol is also a preferred esterification agent.

The esterification reaction is followed by the addition of the diamine or diamines, which are dissolved in the reaction mixture. The temperature is kept below the reflux temperature of the esterification agent during dissolution of the diamines and low enough to avoid polymerization of the diamines and ester.

The essentially non-polymeric, "liquid resin" polyimide precursor that results is typically diluted with the same alcohol employed as an esterification agent in a ratio of 20 parts of alcohol per 100 parts of resin (phr) in the case of copolyimide systems and at a phr of 30 when terpolyimide systems are involved. This diluted resin is compounded with the glass microballoons, typically in a variable speed mixer, producing a formulation with a pastelike consistency.

For our purposes we employ from 5 to 50 percent of the microballoons based on the weight of the polyimide into which the precursor is ultimately converted. On the order of 30 weight percent of the microballoon filler has proven optimum for one polyimide system which will be described in more detail below.

Additives may also be incorporated in the blocking material formulation to alter or control the properties of the blocking material. One that is particularly useful is a cross linking agent. From 10 to 20 weight percent of an agent of that character materially increases the hydrolytic stability of the blocking material.

The particular kind of microballoons employed in the blocking material formulation is not critical although they should be in the range of 0.07 to 0.12 mm in diameter to provide the wanted resistance to screw withdrawal. 3M Company type C-15X glass microballoons have proven satisfactory.

The initial step in converting the precursor-filler formulation to a blocking material is to spread it on a suitable support or substrate in an appropriate thickness.

Next, the artifact this produces is dried. That may be done by heating the artifact in a circulating air oven, typically at a temperature in the range of 70°–93° C. (160°–200° F.) until an optimum 29 to 31 percent of the solvent alcohol has been evaporated.

The dried artifact is heated to develop a cellular physical structure in which the filler is uniformly distributed and a polyimide chemical structure from the precursor.

Thermal heating may be employed for these purposes. Temperatures of 230° to 315° C. (446° to 600° F.) for periods of 15 to 30 minutes have proven capable of foaming and curing the precursor. Another regime that has proven satisfactory involves heating the formulation first at a temperature of 104° to 163° C. (220° to 325° F.) for 15 to 20 minutes to develop the foam and than at a temperature of 288° to 315° C. (550° to 600° F.) for 30 to 60 minutes to cure it.

Alternatively, the foaming and curing of the precursor or those and the drying step can be accomplished by microwave heating.

Foaming-curing parameters that have proven satisfactory in converting representative precursors are two to 12 minutes exposure to high frequency radiation in an oven operating at a frequency of 915 to 2450 mHz and at a 3.75 to 15 kW power output and a power output to precursor weight ratio of 0.6 to 1 kW/kg.

Drying can be carried out as an earlier stage in the same oven using a power output of 1.25 to 2.5 kW, also for 2 to 12 minutes, to reduce the volatiles content of the polyimide precursor-microballoon formulation by the optimum 29 to 31 percent.

Steady application of the microwave energy is not required, and pulsed or cyclic exposure of the precursor to the microwave energy may even produce superior results. Typically, the duration of the microwave energy pulses and of the intervals therebetween will be on the order of 60 and 20 seconds, respectively.

Also, conductive fillers can often advantageously be incorporated in the precursor to promote its conversion to a polyimide by generating additional thermal energy. From 5 to 20 weight percent of activated carbon or graphite can be employed for that purpose.

Similarly, an optimum product can in many, if not most, cases be obtained by heating the substrate or mold on or in which the precursor is foamed to a temperature of 121.1° to 148.9° C. (250° to 300° F.) before the precursor is exposed to microwave energy.

Another technique that can be used to advantage in making blocking materials and structural components including such materials by the practice of the present invention is thermal heating of the microwave cavity. Temperatures in the range of 121.1° to 232.2° C. (250° to 450° F.) are employed.

In addition, the microwave heating step or steps can often be followed to advantage by a thermal postcure of the polyimide. This is accomplished by heating the product of the microwave heating step in a circulating air oven at a temperature of 500° to 550° F. for 30 to 200 minutes.

The microwave techniques for heating the precursor require that a substrate or mold material which is compatible with the microwave radiation be employed. If a mold technique is used, the material must also have sufficient flexural strength to withstand the pressure of the expanding foam. Substrate and mold materials that have been found suitable include Ridout Plastics Company polypropylenes lined with a Teflon-coated glass (Taconic 7278); Pyroceram (a Corning Glass crystalline ceramic made from glass by controlled nucleation); and glass filled polyimides. Other materials possessing the necessary attributes discussed above can also be employed.

It was pointed out above that the blocking material can be made as an integral edging or other part of a structural component such as a panel.

In one exemplary process for making panels with integral portions of blocking material in accord with the principles of our invention, the pastelike formulation of polyimide resin and glass microballoons is again spread on a suitable support, typically in a hollow rectangle corresponding to the outer perimeter of the panel that will ultimately result. A drying step as described above follows.

Next, a liquid resin polyimide precursor as described above and compounded with selected fillers is spread on glass cloth (e.g., Owens Corning Style 120) wet with the resin in the hollow rectangle formed by the blocking material formulation. A second resin wetted glass cloth is placed on top the compounded resin.

The resulting assembly is dried, again as described above; sandwiched between sheets of a microwave compatible material; and processed first in a microwave oven and then by thermal post-curing or processed by thermal heating, all as described above.

Various fillers including carbon mats, glass strands, rovings, and microballoons and E. I. DuPont de Nemours and Company Kevlar and Nomex Fibers can be employed in panels made by the techniques just described. From 5 to 40 weight percent of filler based on the weight of the ultimately formed polyimide can be used, depending upon the physical properties wanted in the panel and the particular filler that is used.

Other additives such as cross linking agents can be added to the resulting composition to impart wanted properties to the final product. A surfactant can also be added to increase fatigue resistance and to increase the bubble stability of the polyimide and the uniformity of the cellular structure.

One preferred surfactant is FS-B, a nonionic, fluorinated, polyalkylene copolymer manufactured by E. I. DuPont de Nemours and Company.

Other surfactants that have been successfully employed are FS-C, AS-2, and X-3, nonionic surfactants of the same general chemical composition as FS-B and manufactured by the same company, and L-530, L-5410, and L-5430, which are silicone surfactants manufactured by Union Carbide Company. We employ from 0.015 to 1.5 percent of surfactant based on the weight of the ester and diamine constituents.

We do not claim that either blocking materials or polymeric compositions filled with glass particles of spherical configuration are categorically novel.

The previously proposed blocking materials of which we are aware, however, are polyurethane based. They consequently are highly flammable, and they furthermore give off toxic fumes as they burn. Our novel blocking materials, in contrast, are high temperature resistant; and they are capable of undergoing oxidative degradation without generating toxic products or smoke.

U.S. Pat. No. 3,947,388 issued May 23, 1974, to Ohkawa et al is believed by us to be representative of those prior art patents dealing with glass sphere filled polymers.

The Ohkawa et al materials, intended for applications where light reflecting capability is important, contain glass beads having diameters in the 1 to 2 mm range. They are consequently not blocking materials; the relatively large beads would afford little resistance to screw withdrawal.

Furthermore, Ohkawa et al is not concerned with polyimide-based systems at all, let alone with the particular systems of that character utilized by us.

The particular polyimide systems we employ and the particular techniques we employ for making blocking materials and structural components containing such materials also distinguish our inventions from the microballoon filled polyimides disclosed in U.S. Pat. No. 3,761,430 issued Sept. 25, 1973, to Witzel.

The Witzel polymers are derived from unsaturated bisimides, not tetracarboxylic acid diesters; and the filler is compounded with the polymer, not its essentially non-polymeric precursor as is the case in our process. Furthermore, Witzel is concerned with fillers capable of imparting specified electrical characteristics to his polymers, not resistance to screw withdrawal.

The reader will realize, from the foregoing, that important and primary objects of our invention reside in the provision of novel, improved blocking materials and in the provision of processes for making such materials.

Other important, and primary, objects of the invention reside in the provision of novel, improved structural components in which those materials are integrated and in the provision of methods for making the structural components.

Yet other important, but more specific, objects of our invention reside in the provision of blocking materials:

which are temperature resistant and capable of undergoing oxidative degradation without generating smoke or toxic products;

which can be fabricated readily, and relatively economically, as such or as integral parts of structural components; and which are derived from tetracarboxylic acid diester/diamine-based, polyimide precursors compounded with glass microballoons.

Still other important, specific objects of our invention are the provision of structural components of the character identified above:

which overall have a relatively low density but can nevertheless be easily and securely fastened to other components;

which are light in weight but strong and rigid and can accordingly be used as flooring and in other demanding applications;

which are fire resistant and hydrolytically stable;

which are durable;

which can be manufactured economically and with relative ease in large sizes.

Still other important objects of the invention are the provision of methods for manufacturing blocking materials and structural components of the character described above which are suitable for large scale production and are versatile, allowing the blocking materials and structural components to be produced in a wide variety of forms with widely varying mechanical, thermal, and other properties.

Figure 2:
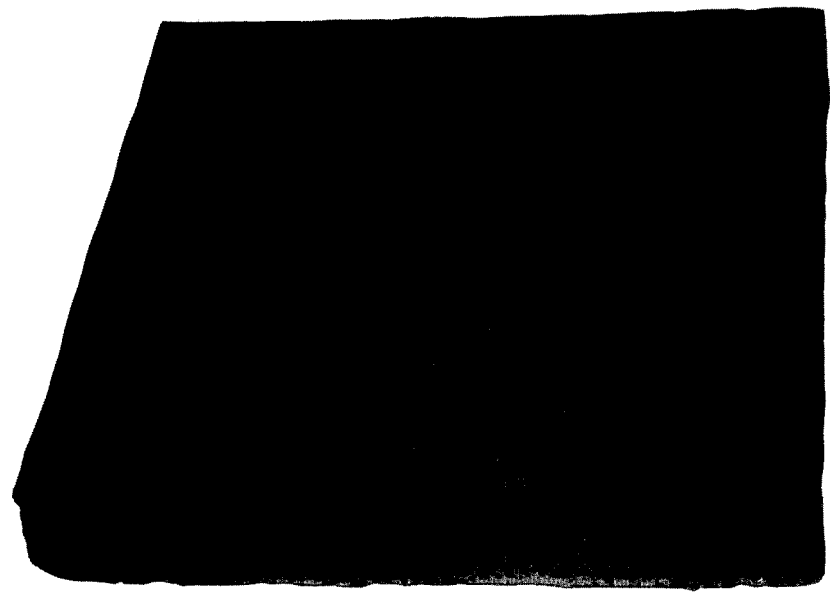
Figure 3:
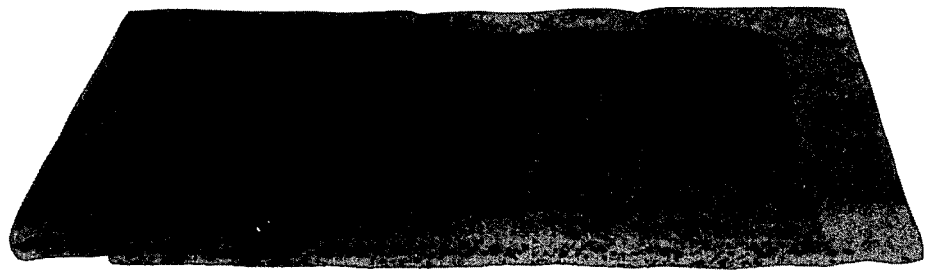

Other important objects and features and additional advantages of our invention will be apparent to the reader from the foregoing and the appended claims. Still others will become apparent as the ensuing description and discussion of our invention proceeds in conjunction with the accompanying drawing in which:

FIG. 1 is a section through a panel fabricated in accord with the principles of the present invention; the panel has edgings of a blocking material embodying and made in accord with those principles;

FIG. 2 pictorially illustrates a blocking material in accord with the principles of the present invention; and FIG. 3 similarly depicts a rigid panel with which has edgings of blocking material embodying, and is fabricated in accord with the principles of, our invention.

Referring now to the drawing, FIG. 1 depicts a multiple density wall panel 10 constructed in accord with the principles of the present invention.

Panel 10 has an outer frame or edging 12 of blocking material, a low density core 14, and a rib 16 also made of the blocking material. The panel can be attached to structural supports by installing threaded fasteners in the apertures 18 provided in edging 12 and rib 16.

Examples detailing the manufacture of representative blocking materials that might be found in edging 12 and rib 16 and the fabrication of a panel such as that illustrated in FIG. 1 follow.

A representative polyimide system that can be employed both in our blocking materials and in the cores of structural components incorporating such materials is our 1702-1.

The 1702-1 precursor was prepared by adding 3,3',4,4'-benzophenonetetracarboxylic acid dianhydride (322.2 g, 1.0 mole) to 240 ml of methyl alcohol and 24 ml of $H_2O$ in a one-liter, three-neck flask equipped with a thermometer, a mechanical stirrer, and a reflux condenser. After addition, the mixture was heated and refluxed until clear. The mixture was then refluxed for an additional 60 minutes to ensure complete esterification of the acid to its half ester.

The reaction mixture was cooled to 40°–50° C. (104°–122° F.).

2,6 Diaminopyridine (32.8 g, 0.3 mole) and p-p'methylene dianiline (138.7 g, 0.7 mole) were added to the half ester solution, and the mixture was heated at 60°–65° C. (140°–149° F.) for five minutes to dissolve the diamines.

To make a blocking composition, the resulting liquid resin was diluted with 20 phr of methyl alcohol and compounded with 30 percent of C-15X microballoons in an ABBE double shaft mixer.

This produced a formulation of pastelike consistency which was spread at a loading of 2.05 kg/m² (0.42 lbs/ft²) on an aluminum foil support.

Excess solvent was removed by heating the material in a 5 kW Gerling Moore Batch Cavity Model 4115 Microwave Oven on a sheet of Teflon-coated glass cloth at a power output of 1.25 kW for a period of 3–5 minutes.

Foaming was carried out in the microwave oven at a power output of 5.0 kW for six minutes between two sheets of Pyroceram.

The samples were cured in a Blue M circulating air industrial oven at a temperature of 287.7° C. (550° F.) for 30 minutes.

A screw withdrawal test was made of the resulting blocking material to demonstrate its utility using the protocol and equipment specified in ASTM Standard D-1761.

The results are compared with the specifications the blocking material was intended to meet in the following table:

TABLE 1

Screw Withdrawal Test of Blocking Material

| | DENSITY | | FORCE | |
|---|---|---|---|---|
| | lbs/ft³ | kg/m³ | lbs | N |
| Actual | 16 | 256 | 196 | 872 |
| Specification | 16 | 256 | 150 | 668 |

Specimens were also tested for machinability. In these tests feather edges were generated without difficulty.

A representative sample of this blocking material is shown in FIG. 2.

We subsequently ascertained that the just described blocking material absorbed water to an extent that might rule out its use in applications where hydrolytic stability is required.

The problem was approached by adding varying amounts of Imperial Chemical Company L-170 cross linking agent to the liquid resin-glass microballoon formulation, the procedure for drying, foaming, and curing the formulation remaining the same.

Water absorption of the modified blocking material was measured in accord with ASTM Standard D 2829-69 (1975) except that the underwater weighing rig called for in that specification was not employed.

The results of this study are presented in Table 2 below along with a criterion furnished by one major aircraft manufacturer.

TABLE 2

Water Absorption Testing of Blocking Material

| Sample | Microballoons (%) | L-170 (%) | Water Absorption (%) |
|---|---|---|---|
| 6-6-30-1 | 35 | — | 37.4 |
| 6-6-30-2 | 30 | 10 | 34.1 |
| 6-6-34-6 | 30 | 15 | 31.0 |
| 6-6-33-5 | 25 | 20 | 19.4 |

Specification (at 18 lbs/ft³) approximately 8 percent

While the particular criterion employed for comparison purposes was not met, the data do demonstrate that the properties of our novel blocking materials can be controlled by the types and amounts of additives incorporated in the formulation from which the blocking material is prepared.

In another study, which led to a rigid, multiple density, structural component useful as a wall panel, a formulation containing 25 percent C-15X microballoons, 20 percent L-170 cross linking agent, and 55 percent 1702-1 liquid resin polyimide precursor was spread on aluminum foil as described above.

Solvent was removed by heating the frame or edging in the Gerling Moore microwave oven until the volatiles content of the formulation had been reduced by 29–31 percent.

Owens Corning style 120 satin weave glass cloth wetted with the 1702-1 resin was next laid on the foil in the interior of the rectangle. A liquid resin precursor (1702-1) compounded with 30 percent of 0.25 cm long Owens Corning type 405 glass fibers heated at 800° F. to remove the sizing and 2.2 percent of L-170 cross linking agent was spread on the glass cloth. The glass fiber reinforced, liquid resin precursor was topped with a second, wetted layer of the style 120 glass cloth.

Solvent was removed from the embryonic panel by heating the panel in the Gerling Moore microwave oven at a power output of 1.25 kW for 2.25 minutes.

The aluminum foil was removed from the dried panel and the latter placed between two sheets of Teflon-coated glass cloth.

The dried panel was further processed by foaming and curing the 1702-1 precursor. Foaming was carried out in the microwave oven at a power output of 5 kW between two sheets of Pyroceram. The polyimide was cured in the circulating air oven at a temperature of 287.7° C. (550° F.) for 30 minutes.

The resulting panel with its low density core and edging of screw withdrawal resistant blocking material is shown in FIG. 3.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed and desired to be secured by U.S. Letters Patent is:

1. A structural component comprising an integrated assembly of a reinforced polyimide foam and a blocking material which is a polyimide having uniformly distributed therethroughout glass microballoons of a size and in an amount which is effective to increase the screw withdrawal resistance of the polyimide in which said microballoons are distributed, the polyimide that is foamed and the polyimide in the blocking material both being polymerization products of a 3,3',4,4'-benzophenonetetracarboxylic acid diester and at least two primary diamines.

2. A structural component as defined in claim 1 wherein at least one of said polyimides is a copolyimide containing two primary diamines, one of said diamines being heterocyclic and having nitrogen in the ring and the other of said diamines being a para- or meta-substituted aromatic diamine which is free of aliphatic moieties.

3. A structural component as defined in claim 2 wherein said heterocyclic diamine is present in said copolyimide in a ratio of 0.3 to 0.6 mole of diamine per mole of 3,3',4,4'-benzophenonetetracarboxylic acid ester.

4. A structural component as defined in claim 1 wherein at least one of said polyimides is a terpolyimide containing three diamines, one of said diamines being heterocyclic and having nitrogen in the ring, another of said diamines being a para- or meta-substituted aromatic diamine which is free of aliphatic moieties, and the third of said diamines being aliphatic.

5. A structural component as defined in claim 4 wherein said terpolyimide contains from 0.05 to 0.3 mole of aliphatic diamine and from 0.1 to 0.3 mole of heterocyclic diamine per mole of 3,3',4,4'-benzophenonetetracarboxylic acid ester.

6. A structural component as defined in claim 4 wherein the aliphatic diamine in the terpolyimide has from three to twelve carbon atoms.

7. A structural component as defined in claim 4 wherein the aliphatic diamine in the terpolyimide has the formula

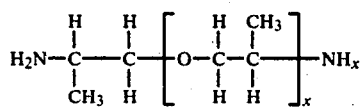

where x is on the order of 2.6.

8. A structural component as defined in either of the preceding claims 2 or 4 wherein the aromatic and heterocyclic diamines in the polyimide are selected from the following group:
2,6-diaminopyridine
3,5-diaminopyridine
3,3'-diaminodipyenyl sulfone
4,4'-diaminodiphenyl sulfone
4,4'-diaminodiphenyl sulfide
3,3'-diaminodiphenyl ether
4,4'-diaminodiphenyl ether
meta-phenylene diamine
para-phenylene diamine
p,p'-methylene dianiline
2,6-diamino toluene
2,4-diamino toluene.

9. A structural component as defined in claim 1 wherein the blocking material contains 0.07 to 0.12 mm diameter microballoons in an amount ranging from 5 to 50 percent based on the weight of the polyimide in that material.

10. A structural component as defined in claim 1 wherein the blocking material contains a cross-linking agent in an amount which is effective to increase the hydrolytic stability of the material.

11. A structural component as defined in claim 10 wherein the blocking material includes from 10 to 20 weight percent of the cross-linking agent.

* * * * *